United States Patent
Harter et al.

(10) Patent No.: US 10,450,011 B2
(45) Date of Patent: Oct. 22, 2019

(54) MOTOR VEHICLE WITH FRONT-END DIFFUSER

(71) Applicant: Dr. Ing. h.c. F. Porsche Aktiengesellschaft, Stuttgart (DE)

(72) Inventors: Sebastian Harter, Leonberg (DE); Mathias Roll, Vaihingen (DE); Michael Soso, Ditzingen-Heimerdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/890,677

(22) Filed: Feb. 7, 2018

(65) Prior Publication Data
US 2018/0244325 A1 Aug. 30, 2018

(30) Foreign Application Priority Data
Feb. 24, 2017 (DE) .................. 10 2017 103 881

(51) Int. Cl.
*B62D 35/02* (2006.01)
*B62D 35/00* (2006.01)
*B62D 37/02* (2006.01)
*F16D 65/847* (2006.01)

(52) U.S. Cl.
CPC ............ *B62D 35/005* (2013.01); *B62D 35/02* (2013.01); *B62D 37/02* (2013.01); *F16D 65/847* (2013.01); *Y02T 10/82* (2013.01); *Y02T 10/88* (2013.01)

(58) Field of Classification Search
CPC ....... B62D 35/00; B62D 35/02; B62D 35/005; B62D 37/02
USPC ................................ 296/180.1–180.3, 180.5
See application file for complete search history.

(56) References Cited

U.S. PATENT DOCUMENTS

| | | | |
|---|---|---|---|
| 6,033,010 A | 3/2000 | Preiss | |
| 8,926,000 B2 | 1/2015 | del Gaizo et al. | |
| 9,216,644 B2 * | 12/2015 | Cardile | B60H 1/241 |
| 9,308,950 B2 | 4/2016 | Wolf | |
| 10,106,211 B2 * | 10/2018 | Parry-Williams | B62D 37/02 |
| 2009/0140543 A1 * | 6/2009 | Caldirola | B60K 11/08 |
| | | | 296/180.5 |
| 2017/0144636 A1 | 5/2017 | Schmidt et al. | |

FOREIGN PATENT DOCUMENTS

DE 102014111073 2/2016

* cited by examiner

*Primary Examiner* — Dennis H Pedder
(74) *Attorney, Agent, or Firm* — Gerald E. Hespos; Michael J. Porco; Matthew T. Hespos

(57) ABSTRACT

A motor vehicle (1) has a front-end diffuser (7) that is open toward a ground surface, and has a device arranged in the region of the diffuser (7) and for varying the downforce of the motor vehicle in the region of a front axle of the motor vehicle. The device has an air conduit (12) with an inlet (13) in the region of a front-end positive pressure area of the motor vehicle and has an outlet (14) in the region of the diffuser (7), and has means (16) for opening and closing the air conduit (12). The device enables the downforce of the motor vehicle in the region of the front axle can be varied.

11 Claims, 2 Drawing Sheets

MOTOR VEHICLE WITH FRONT-END DIFFUSER

CROSS REFERENCE TO RELATED APPLICATION

This application claims priority under 35 USC 119 to German Patent Appl. No. 10 2017 103 881.7 filed on Feb. 24, 2017, the entire disclosure of which is incorporated herein by reference.

BACKGROUND

Field of the Invention

The invention relates to a motor vehicle having a front-end diffuser that is open toward a ground surface, and having a device arranged in the region of the diffuser to vary the downforce of the motor vehicle in the region of a front axle of the motor vehicle.

Description of the Related Art

A diffuser generally is used in a region of a front wheel arch shell of a sports vehicle. The diffuser increases downforce at a front axle of the motor vehicle, and, due to the axle lever, increases lift at the rear axle of the motor vehicle. To compensate for the lift, it is necessary for a rear spoiler to be set to a steeper angle for generating an increased downforce. This is possible, however, only to a limited extent for legal reasons relating to the visibility of a high-level third brake light. Accordingly, it is necessary to limit the action of the diffuser.

The rear spoiler often is adjusted beyond the legal value during operation on a racetrack to offer the maximum downforce to the driver. To restore the aerodynamic vehicle balance, it is necessary for downforce to be generated at the front axle to the same extent. In the case of sports vehicles, this is realized by dismounting an L-shaped profile situated in the wheel arch shell diffuser. However, the dismounting and mounting of the L-shaped profile is restricted by a small ground clearance of the motor vehicle due to the accessibility to fastening screws. Thus, a lifting platform is required for this purpose. Additionally, a dismounted L-shaped profile must be stored safely.

US 2017/0144636 A1 discloses a motor vehicle with a duct between two ram air lips. Aerodynamic characteristics can be varied by a variation of the ram air lip size. The duct may be formed as a diffuser that is open toward an underside of the vehicle.

U.S. Pat. No. 9,308,950 describes a motor vehicle having front-end and rear-end diffusers that are adjustable about pivot axes to guide an air flow.

DE 10 2014 111 073 A1 discloses influencing an air flow of a vehicle by adjustable guide elements. The guide elements are arranged on a wheel arch.

U.S. Pat. No. 8,926,000 A1 presents adjustable flaps in a lower region of a motor vehicle. The flaps are arranged in an air-guiding duct and form front diffusers. The lift and downforce characteristics of the vehicle can be influenced by pivoting the flaps.

U.S. Pat. No. 6,033,010 discloses merging one air stream with a second air stream to influence the aerodynamic characteristics of a motor vehicle. The first air stream forms an air wedge around which the second air stream is guided. A diverting blade is provided to prevent front-axle lift.

It is an object of the invention to further develop a motor vehicle with the simplest possible structural design and uncomplicated handling of the device, and so that the downforce of the motor vehicle in the region of the front axle can be varied.

SUMMARY

The invention relates to a motor vehicle that includes a device with an air conduit having an inlet in the region of a front-end positive pressure area of the motor vehicle and an outlet in the region of the diffuser. The motor vehicle further has means for opening and closing the air conduit.

The invention makes use of the realization that a positive pressure area forms in the front region of a motor vehicle traveling at high speed. Thus, an air stream that has been conducted into the region of the diffuser can be branched off from the positive pressure area to emerge from there and locally effect a flow separation. As a result, the downforce of the motor vehicle in the region of the front axle is reduced. If this reduced downforce is not necessary or not desired, it is merely necessary to shut off the air flow from the front-end positive pressure area to the diffuser. In this case, the diffuser is active in an undisrupted manner in the case of relatively high downforce of the motor vehicle in the region of the front axle. To vary the downforce of the motor vehicle in the region of the front axle, it accordingly merely is necessary to actuate the means for opening and closing the air conduit. If the air conduit is open, the downforce is reduced; by contrast, if the air conduit is closed, greater downforce is generated.

The inlet of the air conduit may be situated in any suitable region of the front end of the motor vehicle in which a positive pressure prevails. This is for example a region in front of a radiator of the motor vehicle, a region in front of a front-end center of the vehicle, or a region arranged in the region of the front end, in particular a region in which air is supplied by means of a so-called air curtain through a forward structure paneling and/or a wheel arch shell to a front wheel and/or to a brake device of a front axle. In these regions, air at positive pressure can be readily branched off and guided into the region of the diffuser.

The inlet may be arranged in the region of an air guide for conducting air to a front wheel and/or to a brake device for a front wheel. The inlet may be arranged in the region of a forward structure panel or of a wheel arch shell of the motor vehicle. In particular, the diffuser is integrated into a wheel arch shell.

The diffuser may be open toward the ground on which the motor vehicle is standing, and thus the diffuser has an open diffuser underside.

The diffuser may have an upper guide wall, by means of which the downforce is generated. In particular, the diffuser may have the upper guide wall and lateral guide walls for guiding the diffuser air flow.

The outlet of the air conduit may be designed in a variety of ways, provided that, when the air conduit is closed, the aim of generating downforce at the front axle is achieved by the air conduit. The outlet of the air conduit may be arranged in the region of the upper or lateral guide wall. The outlet of the air conduit also may arranged in the region of a front third of the diffuser. The outlet of the air conduit may have multiple outlet openings or one or more outlet slots. The multiple outlet openings or multiple outlet slots may be arranged adjacent to one another, and particularly one behind the other in a transverse direction of the vehicle. The outlet of the diffuser may be situated in a transverse plane predefined by the transverse direction of the vehicle.

The outlet of the air conduit may be formed such that, when the air conduit is open, air enters the diffuser over the entire width of the diffuser.

The air may emerge from the outlet vertically. In this way, in the case of air normally flowing substantially horizontally through the diffuser, a particularly effective flow separation can be achieved over the entire width of the diffuser when the air conduit is open.

The means for opening and closing the air conduit may be designed in a variety of ways and may be mechanically acting. For example, the means for opening and closing may be a shut-off means may be manually actuable and may be arranged in the region of the wheel arch.

The means for opening and closing the air conduit enable the user of the motor vehicle to change from the state of the diffuser with relatively high downforce to the state of the diffuser with flow separation and thus relatively low downforce, and vice versa, in an extremely straightforward manner. It is not necessary for the vehicle to be lifted by a lifting platform to perform the conversion work.

By virtue of the air conduit being opened or closed to a greater or lesser extent, it is possible for a defined air stream through the air conduit to be set and guided to the diffuser to locally effect the desired flow separation. The means for opening and closing the air conduit enables the air volume flow through the air conduit to be varied between closed, fully open and various positions of partially open air conduit, and thus for the flow separation to be controlled.

For example, a shut-off valve can be readily moved into the various valve positions by being rotated. There is no need for separate tools to be kept available in order to realize the different operating states. It is also not necessary to dismount parts that would then have to be separately stored.

Further features of the invention will emerge from the appended drawings and from the description of the preferred exemplary embodiment depicted in the drawing, without the invention being restricted thereto.

DETAILED DESCRIPTION

Figure 1:
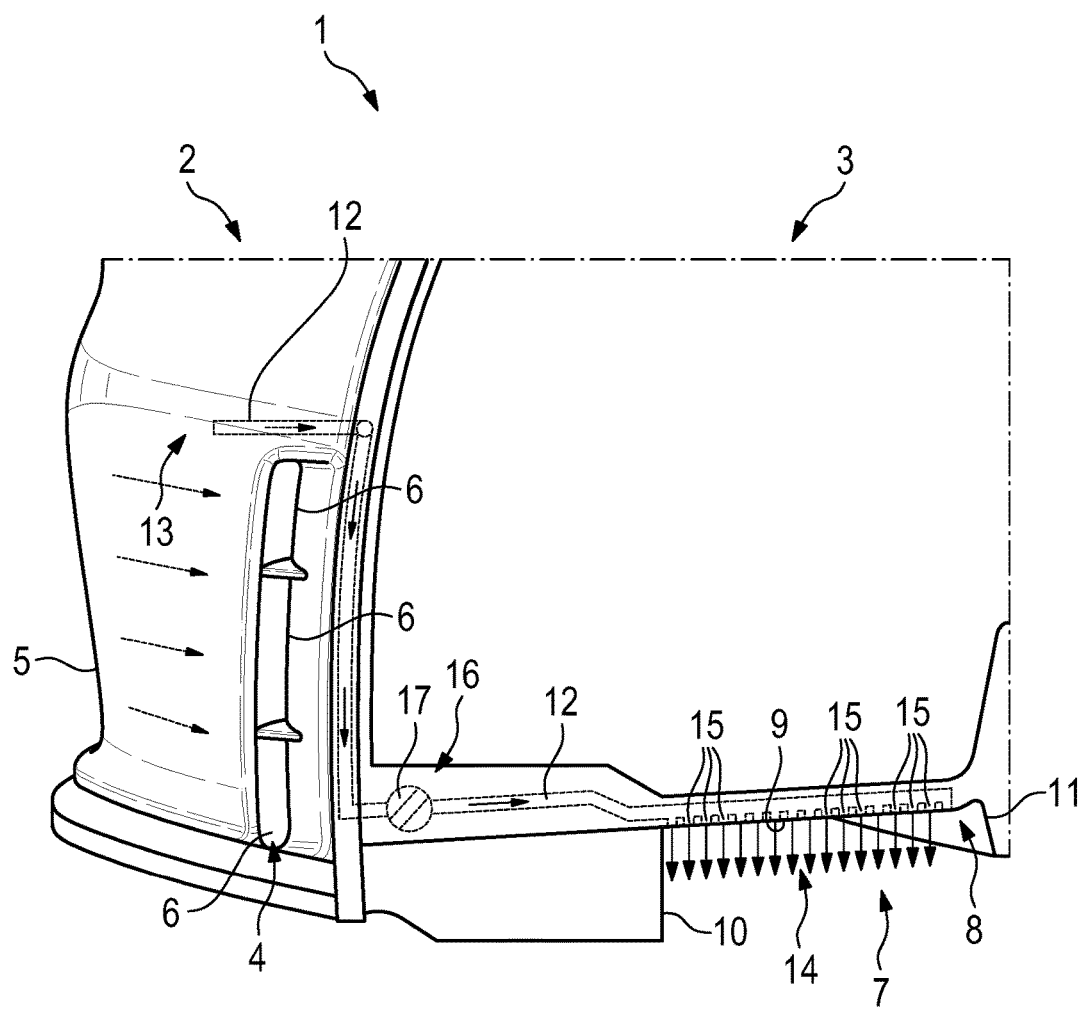
FIG. 1 shows a three-dimensional view of a passenger motor vehicle in the region of a diffuser, as viewed obliquely from the rear, that is to say obliquely oppositely to the forward direction of travel of the vehicle.
Figure 2:
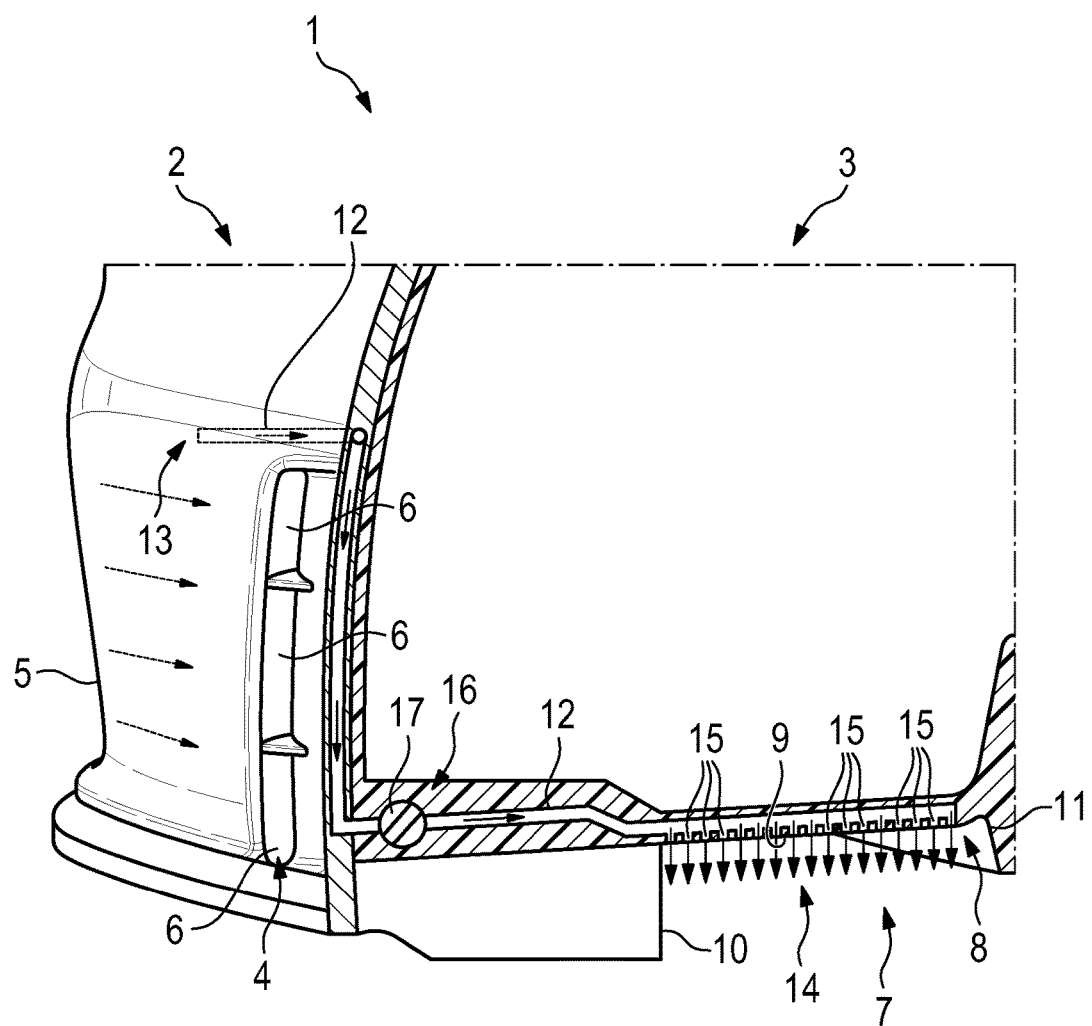
FIG. 2 shows the arrangement of FIG. 1, sectioned in a vertical plane in the region of the air conduit.

FIG. 1 shows a local subregion of a front left region of a sports motor vehicle 1 and specifically a local subregion of a forward structure paneling 2 and a subregion of a wheel arch shell 3 arranged behind the forward structure paneling 2. The wheel arch shell 3 is assigned to the front left-hand wheel of the motor vehicle 1.

Here, the designations front, rear, left, right relate to the motor vehicle 1 traveling forward. The designations top and bottom relate to the vehicle standing on horizontal ground.

The motor vehicle 1 has a flow duct 4 on the left between the forward structure paneling 2 and the wheel arch shell 3, and therefore in front of the left-hand front wheel. The flow duct 4 is formed by the arrangement of forward structure paneling 2 and wheel arch shell 3 and extends substantially from front to rear and vertically. The flow duct 4 thus is arranged in an upright configuration. When the motor vehicle 1 is traveling, an area of positive air pressure forms in the forward structure region of the vehicle, and therefore at the front. Air is conducted via a front, slot-like, vertically oriented inlet 5 into the flow duct 4, and emerges from the flow duct 4 at the rear through a similarly designed vertically oriented slot-like outlet 6. Air is thus conducted through the flow duct 4 in the manner of an air curtain into the region of the front wheel and of a brake disk of the front wheel, with the consequence, firstly, of improved aerodynamics of the motor vehicle, and secondly of additional cooling of the brake disk.

A diffuser 7 is formed on the bottom of the forward structure paneling 2 and of the wheel arch shell 3. The diffuser 7 extends from an inlet (not shown) at the front to the outlet 8 of the diffuser 7 that is situated at the rear end of the wheel arch shell 3. A lower wall of the forward structure paneling 2 and a lower wall of the wheel arch shell 3 forms an upper guide wall 9 of the diffuser 7 in a respective subregion. The upper guide wall 9 is adjoined to the left and right by a left guide wall 10 and a right guide wall 11 of the diffuser 7. The two guide walls 10 and 11 are parallel to one another and are positioned vertically. The diffuser 7 is open down toward the ground, and thus has no guide wall there. The pressure acting vertically in the diffuser 7 thus acts directly from the upper guide wall 9 in the direction of the ground, and gives rise, depending on the magnitude of the pressure, to greater or lesser downforce of the motor vehicle 1 in the region of a front axle, assigned to the front wheel, of the motor vehicle 1.

An air conduit 12 is integrated into the wheel arch shell 3 and preferably is made of plastic. The air conduit 12 has an inlet 13 and an outlet 14. The air conduit 12 opens, in the region of the inlet 13, into the flow duct 4, in which positive air pressure prevails when the vehicle is traveling. The inlet 13 of the air conduit 12 is approximately in the middle of the length of the flow duct 4, and therefore between the inlet 5 and the outlet 6. The air conduit 12 extends from the flow duct 4 through the forward structure paneling 2 into the region of the upper guide wall 9 of the diffuser 7, specifically over the entire region between the left guide wall 10 and the right guide wall 11, parallel to the associated section of the upper guide wall 9 of the diffuser 7. There, the air conduit 12 has a multiplicity of outlet openings 15 arranged one behind the other as viewed in the transverse direction of the vehicle and that open into the diffuser 7.

Means 16 for opening and closing the air conduit 12 are integrated into the wheel arch shell 3. The means 16 are a shut-off valve which has a manually rotatable rotary part 17 for opening and closing the passage of the air conduit 12. If the rotary part is in the shut-off position shown in FIG. 1, a passage of the air stream from the inlet 13 to the outlet 14 of the air conduit 12 is prevented. By contrast, if the rotary part 17 is in the open position, in which it connects the upstream region of the air conduit 12 to the downstream region of the air conduit 12, air at positive pressure in the region of the inlet 13 is forced into the air conduit 12, flows through the air conduit 12 and emerges from the air conduit 12 in the region of the various outlet openings 15. The outlet openings 15 are directed vertically, and thus discharge the air downward.

If the air conduit 12 is closed, the diffuser 7 is active owing to its diffuser geometry, with the consequence of downforce, defined in accordance with the incident-flow conditions, of the motor vehicle in the region of the front axle. If it is sought to reduce the downforce, the rotary part is rotated to such an extent that air flows through the air conduit from the inlet 13 to the outlet 14, and, at the underside of the upper guide wall 9, emerges down through the various outlet openings 15. Thus, a flow separation is locally effected, and vice versa.

LIST OF REFERENCE DESIGNATIONS

1 Motor vehicle
2 Forward structure paneling
3 Wheel arch shell
4 Flow duct
5 Inlet
6 Outlet
7 Diffuser
8 Outlet
9 Upper guide wall
10 Left-hand guide wall
11 Right-hand guide wall
12 Air conduit
13 Inlet
14 Outlet
15 Outlet opening
16 Means
17 Rotary part

What is claimed is:

1. A motor vehicle comprising:
    a forward structure paneling;
    a wheel arch shell adjacent the forward structure paneling;
    a flow duct having an inlet in the forward structure paneling at a region of a front-end positive pressure area of the motor vehicle and the flow duct having an outlet in proximity to the wheel arch shell;
    an air conduit having a front end that is open in the flow duct and a rear end at the wheel arch shell;
    a front-end diffuser that is open toward a ground surface, the front-end diffuser having opposed left and right guide walls and having an upper guide wall extending between the left and right guide walls, the upper guide wall having openings that communicate with the rear end of the air conduit; and
    a valve arranged in the air conduit and being operative for opening and closing the air conduit and thereby varying a downforce of the motor vehicle in a region of a front axle of the motor vehicle.

2. The motor vehicle of claim 1, wherein the front-end diffuser is at a rear end of the wheel arch shell.

3. The motor vehicle of claim 1, wherein the inlet of the flow duct is arranged in a region of the conduit for conducting air to a front wheel and/or to a brake device for a front wheel.

4. The motor vehicle of claim 1, wherein the diffuser is integrated into the wheel arch shell.

5. The motor vehicle of claim 1, wherein the outlet of the air conduit is arranged in the region of a first third of the diffuser.

6. The motor vehicle of claim 1, wherein the outlet of the air conduit has multiple outlet slots.

7. The motor vehicle of claim 6, wherein the multiple outlet slots are arranged one behind the other in a transverse direction of the vehicle.

8. The motor vehicle of claim 7, wherein the outlet of the air conduit is formed such that, when the air conduit is open, air enters the diffuser over the entire width of the latter.

9. The motor vehicle of claim 1, wherein the valve for opening and closing the air conduit is mechanically acting.

10. The motor vehicle of claim 1, wherein the valve for opening and closing comprises a rotary shut-off valve.

11. The motor vehicle of claim 1, wherein the valve for opening and closing is manually actuable in the region of the wheel arch shell.

* * * * *